United States Patent [19]

Fuke et al.

[11] Patent Number: 4,792,245
[45] Date of Patent: Dec. 20, 1988

[54] BEARING DEVICE

[75] Inventors: Takamichi Fuke; Kazuyoshi Ozawa; Atsushi Masuda; Osamu Shigenai, all of Furukawa; Kunihiko Gunji, Miyagi, all of Japan

[73] Assignee: Alps Electric Co., Ltd., Japan

[21] Appl. No.: 101,128

[22] Filed: Sep. 24, 1987

[30] Foreign Application Priority Data

Dec. 15, 1986 [JP] Japan .................. 61-191671[U]

[51] Int. Cl.[4] .................. F16C 19/10; F16C 17/08; B21D 53/10
[52] U.S. Cl. .................. 384/610; 29/149.5 R; 384/425
[58] Field of Search ............ 384/226, 240, 228, 251, 384/420, 425, 428, 439, 438, 610, 617, 108, 121, 245, 244, 454, 490, 590, 609, 616; 29/149.5 R

[56] References Cited

U.S. PATENT DOCUMENTS

| 490,215 | 1/1893 | Simmons | 384/425 X |
|---|---|---|---|
| 588,117 | 8/1897 | Springer | 384/610 |
| 612,398 | 10/1898 | Carver | 384/420 |
| 1,563,869 | 12/1925 | Larson | 384/610 |
| 1,719,789 | 7/1929 | Sparks | 384/251 |
| 2,773,724 | 12/1956 | Hadley | 384/425 |
| 3,161,447 | 12/1964 | Larsson | 384/425 |
| 3,549,218 | 12/1970 | Cagnon et al. | 384/425 |
| 4,315,290 | 2/1982 | Kukreja | 360/106 |
| 4,618,273 | 10/1986 | Götz et al. | 384/610 X |

Primary Examiner—Stuart S. Levy
Assistant Examiner—Thomas R. Hannon
Attorney, Agent, or Firm—Guy W. Shoup; Paul J. Winters

[57] ABSTRACT

A bearing device for rotatably supporting the end of a rotational shaft through a slide bearing to a base comprising a through opening perforated at a part of the base for press-fitting the slide bearing, and a retainer containing opening formed at the base to substantially perpendicularly cross the through opening, and a retainer disposed in the retainer containing opening of the base for bearing the axial force of the rotational shaft, thereby reducing the manufacturing cost and improving its accuracy.

4 Claims, 1 Drawing Sheet

BEARING DEVICE

BACKGROUND OF THE INVENTION

1. FIELD OF THE INVENTION

This invention relates to a bearing device adapted to be used for an electronic equipment such as a magnetic disk device.

2. DESCRIPTION OF THE PRIOR ART

FIG. 5 is an explanatory view showing a conventional bearing device used in a carriage feeding mechanism. In FIG. 5, reference numeral 1 designates a base made of aluminum, numeral 2 denotes a stepping motor mounted on the base 1, and numeral 3 depicts a threaded shaft of a rotational shaft formed with spiral threads 3a on the outer periphery thereof. The right end of FIG. 5 of the threaded shaft 3 is rotatably supported to a bearing device 4 as a reference side bearing which consists of a ball 5 disposed in a recess 1a of the base 1, a high hardness retainer 6 and a cylindrical metal 7. The left end of FIG. 5 of the threaded shaft 3 is fixed therethrough a cylindrical permanent magnet 8 of a rotor of the stepping motor 2, and an elastic member 10 applies an axial tension to the threaded shaft 3 through a ball 9. A cylindrical metal 11 is press-fitted to the base 1 disposed on the front face of the stepping motor 2 to position the radial direction of the shaft 3 similarly to the metal 7. Numeral 12 designates a coil of a stator of the stepping motor 2 and numeral 13 denotes a coil bobbin.

A slide bearing such as an inexpensive metal has been used instead of an expensive ball bearing to reduce its cost as a bearing device of a threaded shaft.

However, since the above-described bearing device 4 is constructed by press-fitting the metal 7 after inserting the retainer 6 into the recess 1a of the bottom of the base 1, it has such drawbacks that machining of finishing the inner diameter of the metal 7 in a predetermined size after press-fitting and raising the coaxial degree of the metal 11, i.e., the sizing enabling by passing the base 1 with a cutting tool cannot be executed. When the sizing work cannot be done, an accurate dimension of the bearing device cannot only be provide,, but the accuracy of drilling of the recess 1a of the base 1 and the dimensional accuracy of the metals 7, 11 before press-fitting must be raised more than required, resulting in an increase in its cost.

SUMMARY OF THE INVENTION

Accordingly, an object of this invention is to provide a bearing device which can reduce the manufacturing cost and can improve its accuracy.

In order to achieve the above and other objects of the invention, there is provided a bearing device for rotatably supporting the end of a rotational shaft through a slide bearing to a base comprising a through opening perforated at a part of the base for press-fitting the slide bearing, and a retainer containing opening formed at the base to substantially perpendicularly cross the through opening, and a retainer disposed in the retainer containing opening of the base for bearing the axial force of the rotational shaft.

According to the bearing device constructed as described above, the slide bearing can be sized accurately after the slide bearing is press-fitted to the through opening of the base. Therefore, the base and the slide bearing are not necessarily formed in advance in a severe dimensional accuracy, and the axial force of the rotational shaft can be retained by arranging the retainer of high hardness in the retainer containing opening of the base after the sizing work is executed.

The above and other related objects and features of the invention will be apparent from a reading of the following description of the disclosure found in the accompanying drawings and the novelty thereof pointed out in the appended claims.

DESCRIPTION OF THE PREFERRED EMBODIMENTS

Embodiments of a bearing device according to the present invention will be described in detail with reference to the accompanying drawings.

Figure 1:
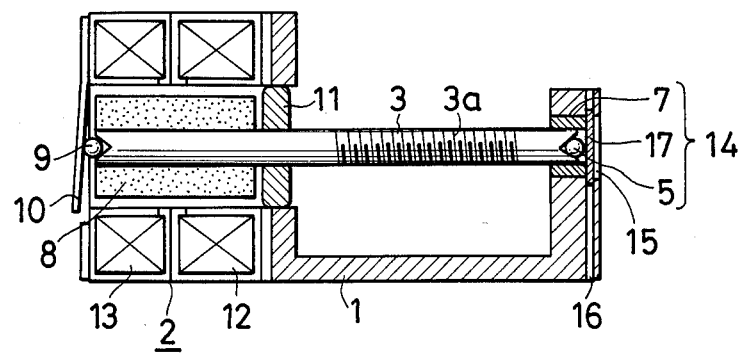
FIG. 1 is an explanatory view showing an embodiment of a bearing device according to the present invention.
Figure 2:
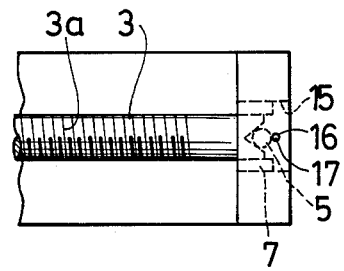
FIG. 2 is a plan view of the essential portion of the bearing device.
Figure 5:
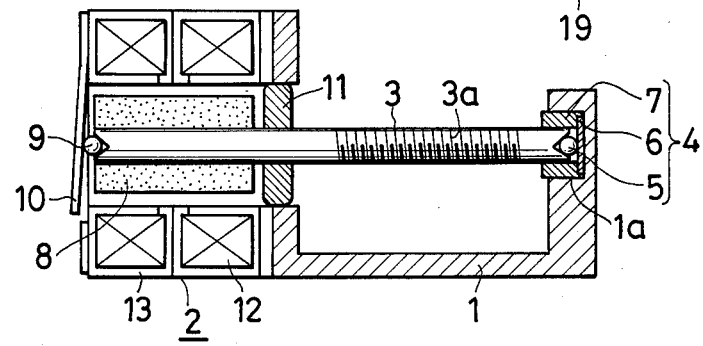
FIG. 5 is an explanatory view showing an example of a conventional bearing device.

FIG. 1 is an explanatory view of an embodiment of a bearing device according to the present invention, and FIG. 2 is a plan view of the essential portion of the bearing device, wherein the same parts and components as those in FIG. 5 designate the same or equivalent parts and components, and the duplicated description will be omitted.

In FIGS. 1 and 2, a base 1 made by aluminum die casting is formed with a through opening 15 perforated axially of a threaded shaft 3, and a small-diameter retainer containing opening 16 perforated to substantially perpendicularly cross the opening 15 to construct a bearing device 14 to become the reference side bearing of the threaded shaft 3. A metal 7 and a needle pin 17 are press-fitted fixedly at predetermined positions in the through openings 15 and the retainer containing opening 16, respectively. The needle pin 17 is a known needle-like steel used for a needle bearing and the like having excellent hardness and area accuracy. This needle pin is used as a retainer in this embodiment. One end of the threaded shaft 3 is inserted through a ball 5 for holding a point contact with the needle pin 17 into the opening 15 of the base 1. Thus, the needle pin 17 is applied with the axial force of the threaded shaft 3, and the metal 7 is provided to radially position to construct the bearing device 14 of the ball 5, the metal 7 and the needle pin 17.

At the other end of the threaded shaft 3 is fixed therethrough a permanent magnet 8 of a rotor of a stepping motor 2, and an elastic member 10 applies an axial compression to the threaded shaft 3 through a ball 9. Further, a metal 11 is press-fitted to the base 1 disposed on the front face of the stepping motor 2 to radially position the threaded shaft 3 similarly to the metal 7.

When the through opening 15 is formed at the reference side bearing of the threaded shaft 3 as described above, sizing work can be carried out after the metals 7, 11 are press-fitted to the base 1 in the assembling steps. Therefore, the coaxial degrees of the metals 7, 11 can be raised accurately, and the base 1, and the metals 7, 11 are not necessarily formed in advance in high accuracy After the sizing work is finished, the needle pin 17 is disposed at a predetermined position in the retainer containing opening 16. Then, the ball 5 can be retained by the needle pin 17, and since the needle pin 17 is less expensive, necessary function of the bearing device can be executed inexpensively.

Figure 3:
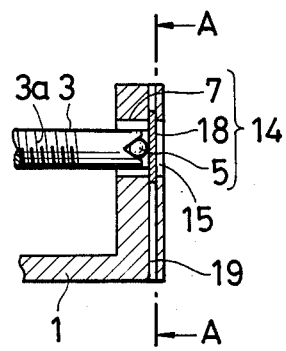
FIG. 3 is an explanatory view showing another embodiment of a bearing device according to the present invention.
Figure 4:
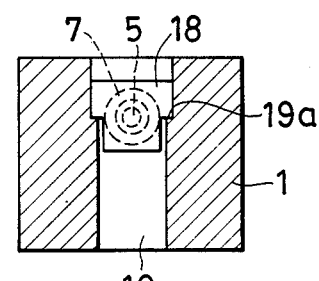
FIG. 4 is a sectional view taken along the line A—A of the bearing device.

FIG. 3 is an explanatory view showing another embodiment of a bearing device according to the present invention, and FIG. 4 is a sectional view taken along the line A—A of FIG. 3. This embodiment has a high hardness retainer 18, a retainer containing opening 19 perforated substantially in T shape, and a stepped portion 19a formed in the opening 19. This another embodiment is different from the first embodiment in the points that the retainer 18 of substantially T shape is used as the retainer of a ball 5, and a slit-like retainer containing opening 19 having a step 9a at the base 1 is formed to contain the retainer 18. Thus, the through opening 15 may be adequately used as the retainer of the ball 5 with a rod-shaped or plate-shaped member having excellent hardness and area accuracy by forming the retainer containing opening to substantially perpendicularly cross the through opening 15 of the base 1.

According to the present invention as described above, the sizing work can be executed after the slide bearing such as the metal is press-fitted into the through opening of the base. Therefore, even if the base and the slide bearing are not finished in advance in a severe dimensional accuracy, the bearing device of high accuracy can be provided. The needle pin is disposed in the retainer containing opening of the base after the sizing work is finished to function the pin as the retainer for retaining the axial force of the rotational shaft, thereby resulting in a reduction in the manufacturing cost.

What is claimed is:

1. In a bearing device for rotationally supporting a shaft rotatable about a shaft axis, said shaft having a first end, a second end opposite said first end, and a given outer diameter, said bearing device including first bearing means supporting said first end of said shaft and second bearing means supporting said second end of said shaft, the improvement comprising:

a base at said first end of said shaft having a through hole extending through said base from a first opening on an outer first side of said base to a second opening on an inner second side of said base in an axial direction along said shaft axis, and a retainer opening formed in a transverse direction perpendicular to said axial direction such that said retainer opening intersects said through hole in said base at a position near to said outer first side of said base;

said shaft having said first end formed with an axial bearing surface in said axial direction at said first end;

said first bearing means formed as a slide bearing press fitted into said through hole in said base and having an inner diameter fitting said outer diameter of said shaft and aligned with said second bearing means in coaxial alignment, so as to allow rotation of said shaft supported in said slide bearing and said second bearing means;

said slide bearing extending from said inner second side of said base through said through hole to the position of said transverse retainer opening;

means in conjunction with said second bearing means for providing an axial compression force on said shaft at said second end thereof; and a retaining member inserted into said retainer opening in said base, said retaining member and said retainer opening having corresponding shapes such that said retaining member is seated in said retainer opening and positioned across said through hole wherein said axial bearing surface at said first end of said shaft is pressed into bearing contact with said retaining member by said axial compression force, whereby during assembly said slide bearing is press fitted into said through hole in said base and a final sizing operation of the inner diameter of said slide bearing can be performed through said first opening on said outer first side of said through hole to properly size and align said slide bearing with said second bearing means for precise coaxial support of said shaft.

2. A rotational bearing device according to claim 1 wherein said retaining means is formed in the shape of a needle pin.

3. A rotational bearing device according to claim 1 wherein said retaining means is formed in the shape of a plate.

4. A method of forming a bearing device for rotationally supporting a shaft rotatable about a shaft axis, said shaft having a first end, a second end opposite said first end, and a given outer diameter, said bearing device including first end, and a means supporting said first end of said shaft and second bearing means supporting said second end of said shaft, the improved method comprising:

providing a base at said first end of said shaft having a through hole extending through said base from a first opening on an outer first side of said base to a second opening on an inner second side of said base in an axial direction along said shaft axis, and a retainer opening formed in a transverse direction perpendicular to said axial direction such that said retainer opening intersects said through hold in said base at a position near to said first side of said base;

forming said shaft with an axial bearing surface in said axial direction at said first end;

forming said first bearing means by press fitting a slide bearing into said though hole in said base, said slide bearing having an inner diameter fitting said outer diameter of said shaft and aligned with said second bearing means in coaxial alignment and having a length in said axial direction extending from said second side of said base through said through hole to the position of said transverse retainer opening;;

performing a final sizing operation of said inner diameter of said slide bearing, after said slide bearing has been press fitted into said through hole, by inserting a cutting tool through said first opening on said outer first side of said base, so as to precisely size and coaxial align said slide bearing with said second bearing means for precise rotational support of said shaft;

assembling said shaft to said second bearing means including providing an axial compression force on said shaft at said second end; and inserting a retaining member into said retainer opening in said base to position said retaining member across said through hole wherein the axial bearing surface at said first end of said shaft is pressed by said axial compression force into bearing contact with said retaining member.

* * * * *

UNITED STATES PATENT AND TRADEMARK OFFICE
CERTIFICATE OF CORRECTION

PATENT NO. : 4,792,245
DATED : December 20, 1988
INVENTOR(S) : Fuke et al.

It is certified that error appears in the above-identified patent and that said Letters Patent is hereby corrected as shown below:

Col. 4, line 27, delete "end, and a" and insert --bearing--.

Inventor's name "Kazuyoshi Ozawa" should read --Kazuyoshi Kozawa--.

Signed and Sealed this

Fifth Day of September, 1989

Attest:

DONALD J. QUIGG

*Attesting Officer*

*Commissioner of Patents and Trademarks*